United States Patent
Yu et al.

(10) Patent No.: US 9,692,308 B2
(45) Date of Patent: Jun. 27, 2017

(54) SWITCH-MODE POWER SUPPLY CURRENT MONITORING WITH OVER CURRENT AND OVERLOAD PROTECTION

(71) Applicant: Infineon Technologies Austria AG, Villach (AT)

(72) Inventors: Weifu Yu, Singapore (SG); Mingping Mao, Singapore (SG); Tong Bao, Singapore (SG); Guoxing Zhang, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/928,475

(22) Filed: Oct. 30, 2015

(65) Prior Publication Data

US 2017/0126140 A1    May 4, 2017

(51) Int. Cl.
*H02M 3/335* (2006.01)
*H02M 1/32* (2007.01)
*H02M 1/00* (2006.01)

(52) U.S. Cl.
CPC ......... *H02M 3/33546* (2013.01); *H02M 1/32* (2013.01); *H02M 2001/0009* (2013.01)

(58) Field of Classification Search
CPC ............... H02M 3/33546; H02M 1/32; H02M 2001/0009
See application file for complete search history.

(56) References Cited

U.S. PATENT DOCUMENTS

| | | | | |
|---|---|---|---|---|
| 6,385,061 | B1* | 5/2002 | Turchi ................ | H02M 1/34 323/902 |
| 2007/0195559 | A1* | 8/2007 | Gong ................ | H02M 3/33507 363/21.01 |
| 2010/0259954 | A1 | 10/2010 | Santoro et al. | |
| 2014/0313787 | A1* | 10/2014 | Chen ................ | H02M 1/32 363/21.01 |
| 2014/0362621 | A1* | 12/2014 | Huang ............... | H02M 3/33507 363/50 |
| 2016/0126845 | A1* | 5/2016 | Cohen ............... | H02M 3/33507 363/21.01 |
| 2016/0226389 | A1* | 8/2016 | Quaglino .......... | H02M 3/33592 |

* cited by examiner

*Primary Examiner* — Jue Zhang
*Assistant Examiner* — Lakaisha Jackson
(74) *Attorney, Agent, or Firm* — Shumaker & Sieffert, P.A.

(57) ABSTRACT

A device for current protection comprises a switch-mode power supply controller. The switch-mode power supply controller includes an inrush current comparator that is arranged to compare a primary winding current with an inrush current threshold at least during at least one of a startup phase or a burst phase. The switch-mode power supply controller also includes a switch controller that is arranged to control regulation of an output voltage by controlling turning of a primary switch on and off based on a feedback signal that is based, at least in part, on the output voltage. The switch controller is further arranged to, if the inrush current comparator determines that the primary winding current has reached the inrush current threshold, control the primary switch to turn off and remain turned off until at least a next switching cycle.

20 Claims, 5 Drawing Sheets

400

SWITCH-MODE POWER SUPPLY CURRENT MONITORING WITH OVER CURRENT AND OVERLOAD PROTECTION

TECHNICAL FIELD

This disclosure relates to switch-mode power supplies, and more specifically to current monitoring and protection for a switch-mode power supply with an isolated topology.

BACKGROUND

A switch-mode power supply is an electronic power supply that uses a switching regulator to generate the supply voltage. A high switching frequency may cause an increase of the so-called driving losses and of the so-called switching losses. While driving losses are caused by the electrical power required for switching the switching elements, there are two different types of switching losses. A first type of switching losses is given by the simultaneous presence of current through the switching elements and voltage across their terminals during the switching thereof ("hard switching" condition). The second type of switching losses, typically called capacitive losses, is caused by the parasitic capacitance associated with each switching element, which is discharged on the resistance of the switching element itself while this is activated. Both capacitive and switching losses are proportional to the operating frequency of the switching elements. Capacitive losses are proportional to the squared switched voltage.

In order to reduce switching losses and allow high frequency operation, resonant conversion techniques have been widely developed. These techniques provide for processing electrical power in a sinusoidal manner, and controlling the switching elements in such a way to limit the occurrence of hard switching.

Resonant converters operated from the rectified power grid voltage are typically realized using the half-bridge and the full-bridge topologies. With reference to resonant DC-DC (direct current to direct current) converters implemented according to the so-called half bridge topology (briefly referred to as half-bridge resonant converters), the switching elements include a high-side transistor and a low-side transistor connected in series between the supply circuit providing the supply voltage to be converted and a terminal providing a reference voltage, such as ground. By properly switching said two transistors it is possible to generate a square wave having a high value (assumed when the high-side transistor is activated) corresponding to the supply voltage and a low value (assumed when the low-side transistor is activated) corresponding to the ground. A small dead-time, where both transistors are off, is typically inserted as soon as each transistor turns off.

The same square wave may be generated by using two pairs of switching elements each one arranged according to the half-bridge topology, but driven in phase opposition to each other. Particularly, the high-side transistor of the first pair and the low-side transistor of the second pair are activated simultaneously; similarly, the low-side transistor of the first pair and the high-side transistor of the second pair are activated simultaneously. This topology is generally referred to as full-bridge topology. A resonant converter based on a full-bridge topology is briefly referred to as a full-bridge resonant converter.

In a resonant converter, the square wave, generated with either a half-bridge or a full-bridge topology, is applied to the primary winding of a transformer through a resonant network that includes at least a capacitor and an inductor; the secondary winding of said transformer feeds a rectifier circuit and a filter circuit for providing an output DC voltage. The value of the output DC voltage depends on the frequency of the square wave, whether it gets closer to or further from the resonance frequency of the resonant network. The duty cycle of the square wave is typically kept at about 50%.

Among the various known configurations of resonant network in resonant converters, the so-called inductor-inductor-capacitor (LLC) configuration is especially suited for those applications in which the value of the DC voltage to be converted is particularly high, such as the one generated through the rectification of the power grid voltage, i.e., in a condition favorable for the occurrence of high capacitive losses. The resonant network of an LLC resonant converter is formed by a series inductor-capacitor (LC) circuit connected between the switching elements and an input of the primary winding of the transformer, and a shunt inductor connected across both the inputs of the primary winding.

With an LLC resonant converter, it is possible to adjust the value of the output DC voltage over wide load and input DC voltage variations with a relatively small variation of the switching frequency.

SUMMARY

In general, the disclosure relates to a device for current protection that comprises a switch-mode power supply controller. The switch-mode power supply controller includes an inrush current comparator that is arranged to compare a primary winding current with an inrush current threshold at least during at least one of a startup phase or a burst phase. The switch-mode power supply controller also includes a switch controller that is arranged to control regulation of an output voltage by controlling turning of a primary switch on and off based on a feedback signal that is based, at least in part, on the output voltage. The switch controller is further arranged to, if the inrush current comparator determines that the primary winding current has reached the inrush current threshold, control the primary switch to turn off and remain turned off until at least a next switching cycle.

In some examples, a device comprises: a switch-mode power supply controller, wherein the switch-mode power supply controller includes: an inrush current comparator that is arranged to compare a primary winding current with an inrush current threshold at least during at least one of a startup phase or a burst phase; and a switch controller that is arranged to control regulation of an output voltage by controlling turning of a primary switch on and off based on a feedback signal that is based, at least in part, on the output voltage; and further arranged to, if the inrush current comparator determines that the primary winding current has reached the inrush current threshold, control the primary switch to turn off and remain turned off until at least a next switching cycle.

In some examples, a method comprises: controlling regulation of an output voltage, including: comparing a primary winding current with an inrush current threshold at least during at least one of a startup phase or a burst phase of the regulation; controlling regulation of an output voltage by controlling of turning a primary switch on and off based on a feedback signal that is based, at least in part, on the output voltage; and if the primary winding current has reached the inrush current threshold, control the primary switch to turn off and remain turned off until at least a next switching cycle of the regulation.

In some examples, A tangible processor-readable storage medium stores processor-executable code that, when executed, causes one or more processors to: control regulation of an output voltage, including: receiving a result of a comparison of a primary winding current with an inrush current threshold at least during at least one of a startup phase or a burst phase of the regulation; controlling regulation of an output voltage by controlling turning of a primary switch on and off based on a feedback signal that is based, at least in part, on the output voltage; and if the result of the comparison determines that the primary winding current has reached the inrush current threshold, controlling the primary switch to turn off and remain turned off until at least a next switching cycle of the regulation.

In some further examples, the switch-mode power supply controller further includes: a level one overcurrent protection comparator that is arranged to compare the primary winding current with a level one overcurrent protection threshold at least during a normal operating phase, wherein the normal operating phase does not overlap with the startup phase, and wherein the normal operating phase does not overlap with the burst phase; wherein the switch controller is further arranged to, if the level one overcurrent protection comparator determines that the primary winding current has reached the level one overcurrent current threshold, control the primary switch to turn off and remain turned off until at least a next switching cycle, and to increase a switching frequency by which the primary switch is controlled to turn on and off; and wherein the switch controller is further arranged to, if the level one overcurrent protection comparator determines that the primary winding current has reached the level one overcurrent current threshold a predetermined number of consecutive times, re-start the control of the output voltage regulation.

In some yet further examples, the switch-mode power supply controller further includes level two overcurrent protection comparator and/overload protection. In some examples, the overload protection determines whether an overload event has occurred and been sustained for a particular period of time, and restarts the switch-mode power supply controller if the overload event is sustained for the particular period of time.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Non-limiting and non-exhaustive examples of the present disclosure are described with reference to the following drawings.

DETAILED DESCRIPTION

Figure 1:
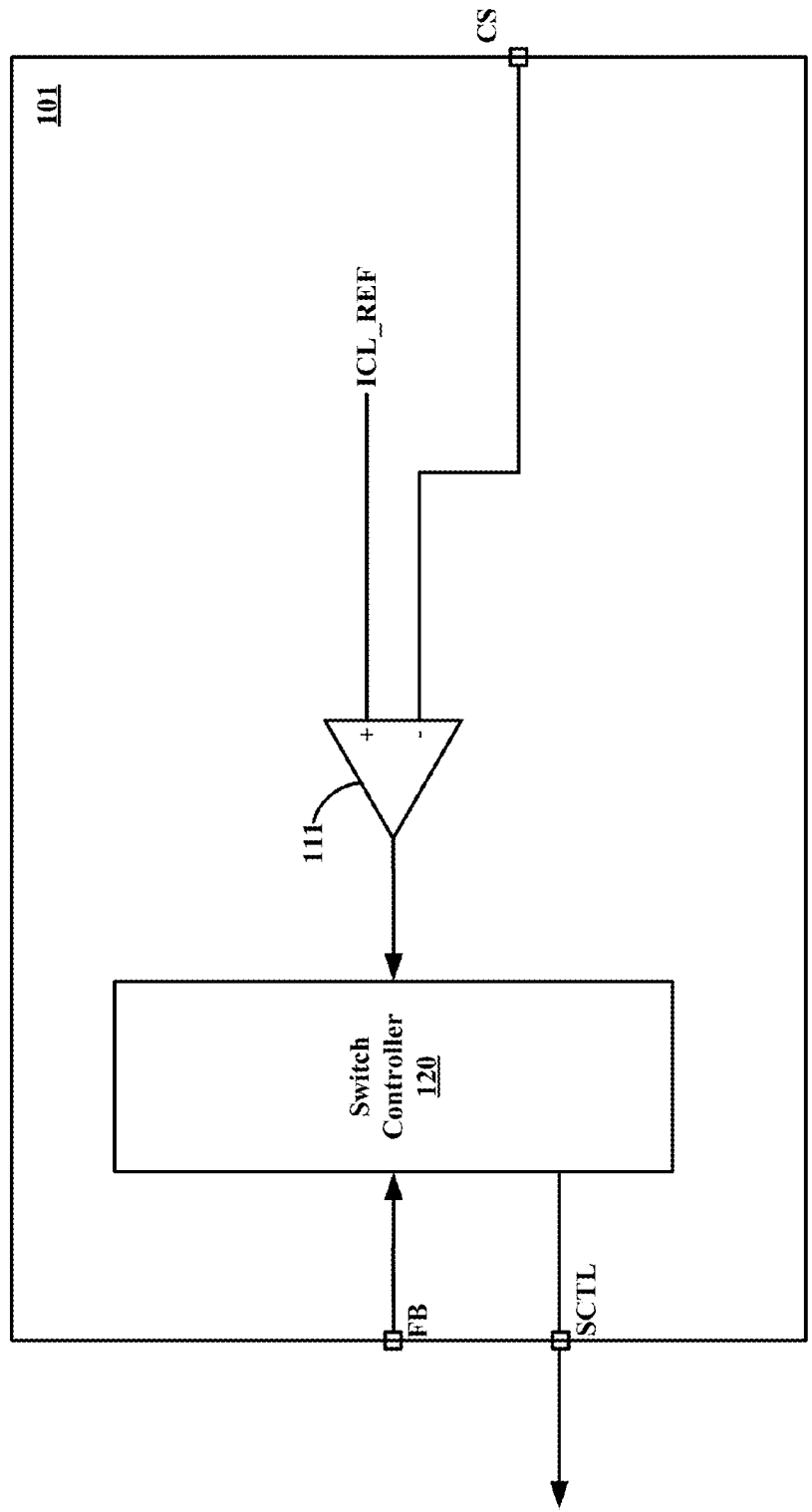
FIG. 1 is a block diagram illustrating an example of a switch-mode power supply controller.

Various examples of this disclosure will be described in detail with reference to the drawings, where like reference numerals represent like parts and assemblies throughout the several views. Reference to various examples does not limit the scope of this disclosure which is limited only by the scope of the claims attached hereto. Additionally, any examples set forth in this specification are not intended to be limiting and merely set forth some of the many possible examples of this disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," or "in one example," as used herein does not necessarily refer to the same embodiment or example, although it may. Similarly, the phrase "in some embodiments," or "in some examples," as used herein, when used multiple times, does not necessarily refer to the same embodiments or examples, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. Where suitable, the term "gate" is intended to be a generic term covering both "gate" and "base"; the term "source" is intended to be a generic term covering both "source" and "emitter"; and the term "drain" is intended to be a generic term covering both "drain" and "collector." The term "coupled" means at least either a direct electrical connection between the items connected, or an indirect connection through one or more passive or active intermediary devices. The term "signal" means at least one current, voltage, charge, temperature, data, or other signal.

FIG. 1 is a block diagram illustrating an example of switch-mode power supply (SMPS) controller 101. An SMPS controller may be arranged so as to be used as part of an SMPS, and reference to parts or signals not shown in FIG. 1 are references to parts or signals from the SMPS, which are not shown in FIG. 1. SMPS controller 101 includes inrush current comparator 111 and switch controller 120. Switch controller 120 is arranged to control regulation of an output voltage by controlling turning of a primary switch on and off based on a feedback signal (FB) that is based, at least in part, on the output voltage. Inrush current comparator 111 is arranged to compare a primary winding current with an inrush current threshold at least during at least one of a startup phase or a burst phase of the output voltage regulation. In the example illustrated in FIG. 1, inrush current comparator 111 compares the primary winding current with the inrush current threshold by comparing current sense signal CS with inrush current reference signal ICL_Ref, where current sense signal CS is based, at least in part, on the primary winding current.

Switch controller 120 is further arranged to, if inrush current comparator 111 determines that the primary winding current has reached the inrush current threshold, control the primary switch to turn off and remain turned off until at least a next switching cycle of the output voltage regulation. In some examples, the primary switch is controlled to remain turned off for several switching cycles. In some examples, switch controller 120 is arranged to control the turning on and off of the primary switch and/or one or more additional switches via switch control signal(s) SCTL output by switch controller 120.

Although the regulation of an output voltage is discussed above with regard to FIG. 1, in some examples, more than one regulated output voltage may be provided all based on the same output voltage regulation controlled by SMPS controller 101.

Figure 2:
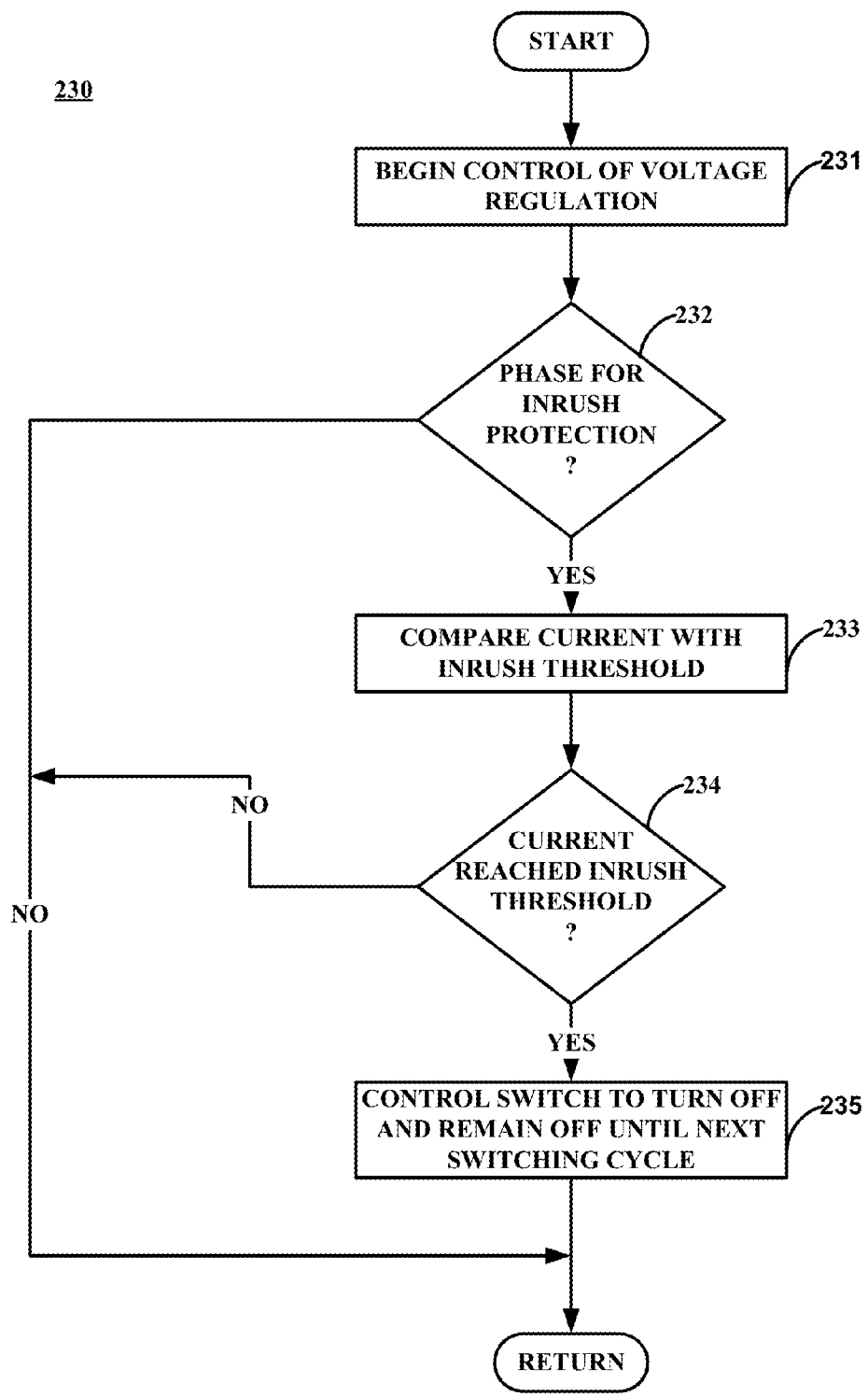
FIG. 2 is a flowchart illustrating an example of a process that may be employed by an example of the switch-mode power supply controller of FIG. 1.

FIG. 2 is a flowchart illustrating an example of process 230, which may be used by an example of switch-mode power supply controller 101 of FIG. 1. After a start block, a switch controller (e.g., switch controller 120 of FIG. 1) begins controlling regulation of an output voltage by turning a primary switch on and off based on a feedback signal (e.g., signal FB of FIG. 1) (231). Next, if the current phase of output voltage regulation is not a phase for which inrush current protection is performed (232), the processing moves to a return block, where other processing is resumed. In some examples, inrush current protection is performed during a startup phase and/or a burst phase, and not during other phases. In some examples, the burst phase is a standby phase. If the current phase of the output voltage regulation is a phase for which inrush current protection is performed (232), an inrush current comparator (e.g., inrush current comparator 111 of FIG. 1) compares a primary winding current with an inrush current threshold (233). The inrush current comparator determines whether the primary winding current reached the inrush current threshold (234). If not, the processing moves to a return block, whether other processing is resumed. Otherwise, the switch controller controls the primary switch to turn off and remain turned off until at least a next switching cycle of the output voltage regulation (235). The processing then advances to a return block, where other processing is resumed.

Figure 3:
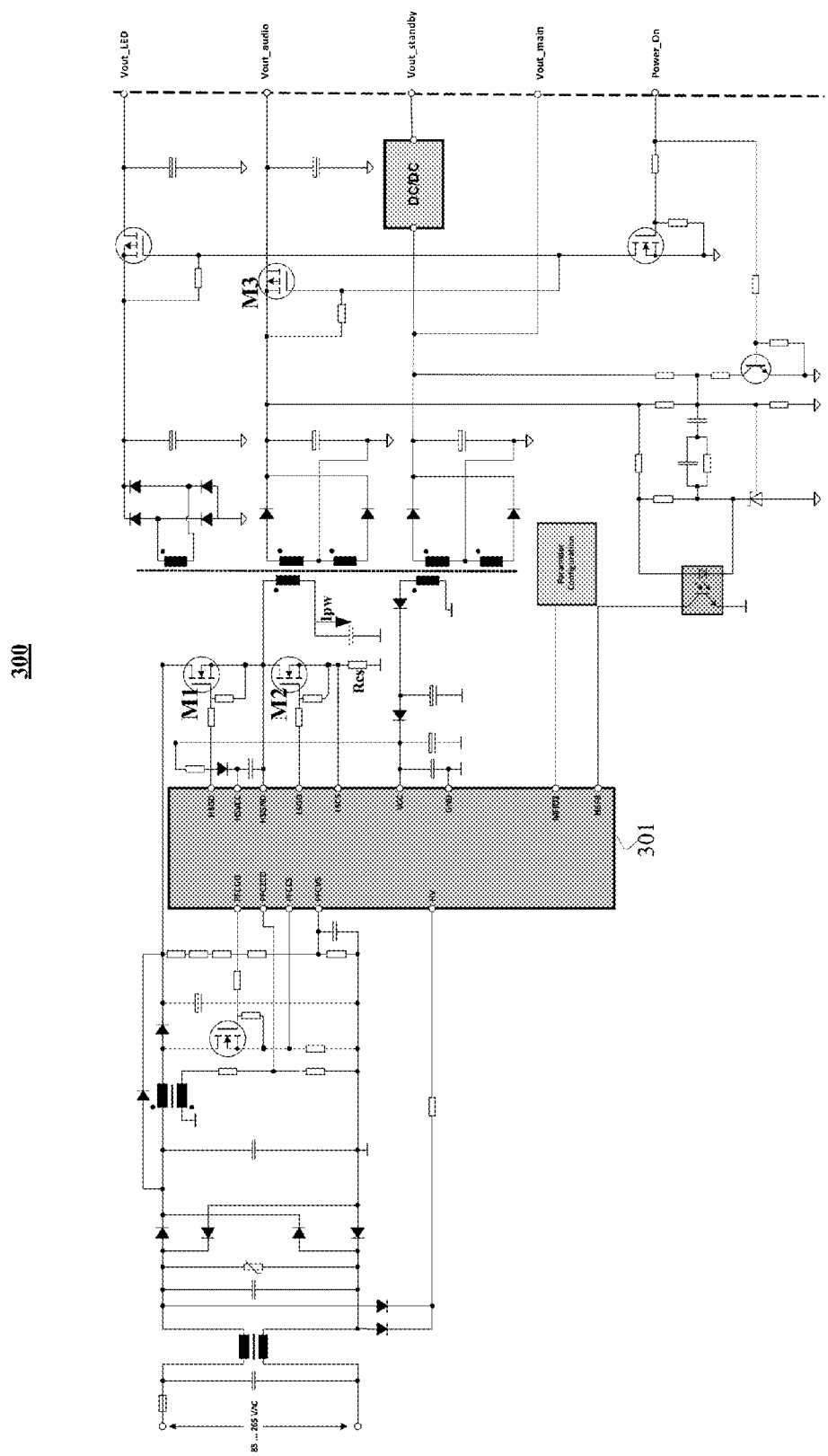
FIG. 3 is a block diagram of an example of a switch-mode power supply (SMPS) that includes an example of the switch-mode power supply controller of FIG. 1.

FIG. 3 is a block diagram of an example of switch-mode power supply (SMPS) 300, which includes, inter alia, SMPS controller 301, which may be employed as an example of switch-mode power supply controller 101 of FIG. 1. Primary current sense signal LSCS is an example of current sense signal CS of FIG. 1. SMPS 300 may sample and feed the primary winding current Ipw to SMPS controller 301 via primary current sense signal LSCS. In some examples, primary current sense signal LSCS is a voltage that is equal to the value of primary winding current Ipw times the resistance value of current sense resistance Rcs.

Transistor M1 is the primary switch of the example of SMPS 300 illustrated in FIG. 3, and transistor M2 is the synchronous switch of the example of SMPS 300 illustrated in FIG. 3. During normal output voltage regulation, SMPS controller 301 controls primary switch M1 to be turned on and off in order to regulate output voltage Vout based on feedback signal HBFB, which is based, at least in part, on the output voltage, where feedback signal HBFB is an example of signal FB of FIG. 1. In various examples, the switching regulation control may be pulse width modulation control, pulse density modulation control, pulse frequency modulation control, constant on-time control, and/or the like. Low-side gate driver signal LSGD and high-side gate driver signal HSGD may be employed as switch controls signals that are an example of switch controls signal(s) SCTL of FIG. 1. In the specific example illustrated in FIG. 3, high-side gate driver control signal HSGD controls the turn-on and turn-off of primary switch M1, and low-side gate driver control signal LSGD controls and turn-on and turn-off of synchronous switch M2. SMPS 300 may be adapted to employ soft-switching, and to prevent hard-switching from occurring.

Some examples of SMPS 300 provide one regulated output voltage Vout, and other examples of SMPS 300 provided multiple regulated output voltages. The example of SMPS 300 specifically illustrated in FIG. 3 includes four regulated output voltages: output voltage Vout, LED output voltage Vout_LED, audio output voltage Vout_audio and main output voltage Vout_main. In some examples, SMPS 300 is also arranged to receive a power on signal Power_On. In some examples, the Power_On signal is used to force SMPS 300 to enter or leave standby operation mode. Standby operation mode is discussed in greater detail below. Additionally, in some examples, the Power_On signal is also used to control load switch M3 to connect or cut off the power supply load. The example of SMPS 300 illustrated in FIG. 3 is a resonant LLC topology. The example of SMPS 300 illustrated in FIG. 3 may be used in medium-large screen television (TV) power supply applications. However, the disclosure is not limited to this particular example, and any suitable SMPS power supply application may be employed in various examples.

Figure 4:
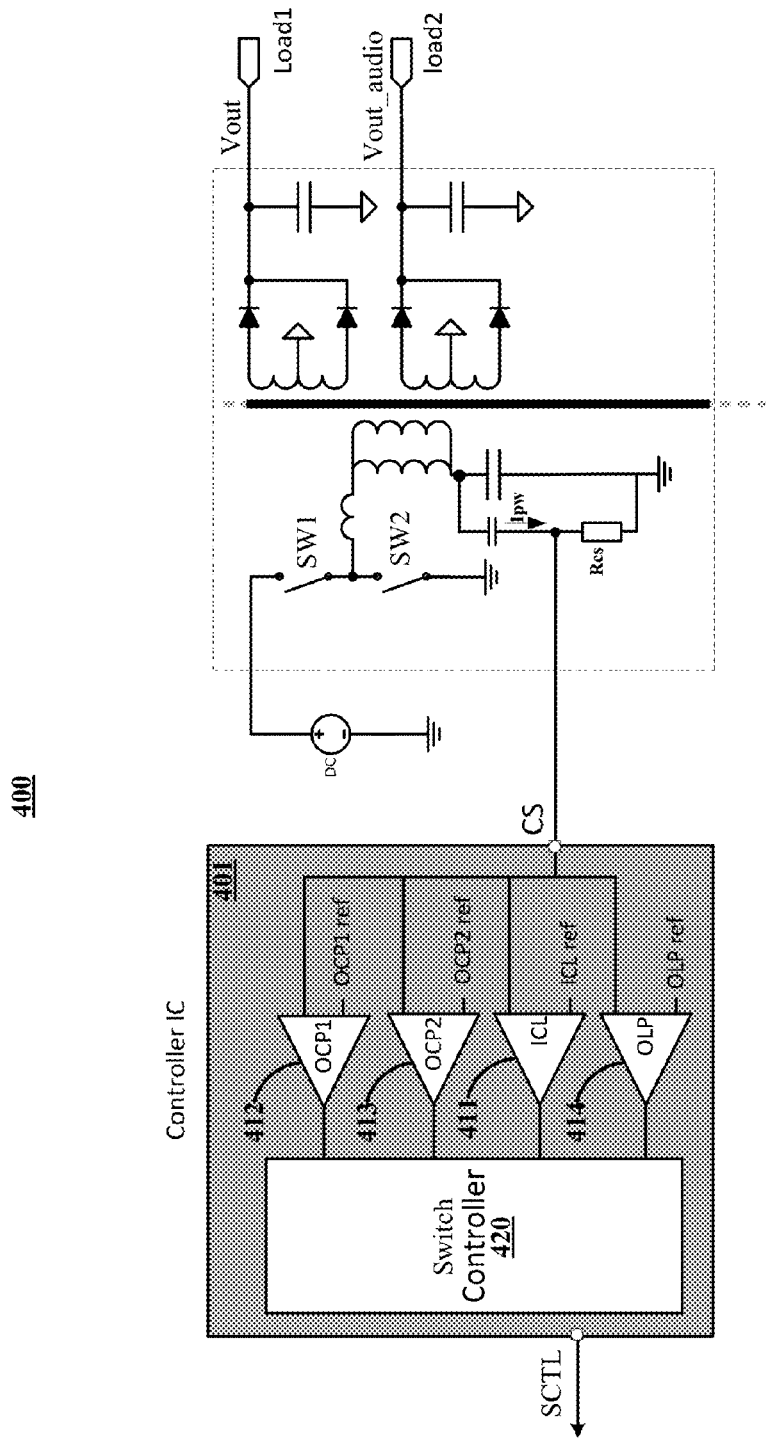
FIG. 4 is a block diagram illustrating an example of the SMPS of FIG. 3.

FIG. 4 is a block diagram illustrating an example of switch-mode power supply (SMPS) 400, which may be employed as an example of SMPS 300 of FIG. 3. Switch controller 420 may be employed as an example of switch controller 120 of FIG. 1, and inrush current limitation (ICL) comparator 411 may be employed as an example of inrush current comparator 111 of FIG. 1. SMPS controller 401 may further include over-current protection (OCP) level one comparator 412, OCP level 2 comparator 413, and overload protection comparator 414.

In some examples, OCP1 comparator 412 is arranged to compare signal CS with reference OCP1 ref, OCP2 comparator 413 is arranged to compare signal CS with reference OCP2 ref, and overload protection (OLP) comparator 414 is arranged to compare signal CS with reference OLP ref. Each of the comparators 411-414 may be used for a different kind of current protection (in-rush current limitation (ICL) protection, OCP1 protection, OCP2 protection, and OLP, respectively). In some examples, switch controller 420 is arranged to provide current protection based on the outputs of comparators 411-414. The various kinds of current protection (e.g., ICL protection. OCP1 protection. OCP2 protection, and OLP) are performed during particular phases, as discussed in greater detail below with regard to FIG. 5.

SMPS controller 401, using the various forms of current protection discussed in greater detail below, is arranged to provide systematic current monitoring and protection that ensures that the chance of hard switching on the SMPS is minimal, and effectively prevents SMPS 400 from damage.

In some examples, switch controller 420 is a digital controller. In some of these examples, the flexibility of the digital power platform, in conjunction with the other components, may be useful in properly providing a systematic current monitoring method to handle the complex current abnormality problems in different operating conditions. The use of digital control may also be useful in providing adaptive thresholds for the current comparisons. In some examples, the digital controller includes a CPU.

The disclosure is not limited to a digital implementation of switch controller 420, however, and some examples of switch controller 420 are analog, a combination of analog and digital, and/or the like.

In one or more examples, the functions described as performed by switch controller 420 may be implemented in hardware, software, firmware, or any combination thereof. If implemented in software, the functions may be stored as one or more processor-executable instructions or processor-executable code on an article of manufacture comprising a processor-readable medium or computer-readable medium. Computer-readable media may include computer data storage media. Data storage media may be any available media that can be accessed by one or more computers or one or more processors to retrieve instructions, code, and/or data structures for implementation of the techniques described in this disclosure. By way of example, and not limitation, such computer-readable media or processor-readable media can comprise RAM. ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media or processor-readable media. Through the specification and the claims, the term "tangible computer-readable storage medium" is specifically defined herein to exclude propagating signals per se, but the term "tangible processor-readable storage medium" does include random access memory (RAM), register memory, processor cache, and the like.

The code may be executed by one or more processors, such as one or more central processing units (CPUs), one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Although FIG. 4 illustrates an example of SMPS controller 401 in which ICL protection, OCP1 protection, OCP2 protection, and OLP are all used, some examples of SMPS controller 401 do not employ all four of these forms of current protection, but instead employ some subset of these four forms of current protections consisting of one, two, or three of these forms of protection, and may also include other forms of protection as well in some examples.

Figure 5:
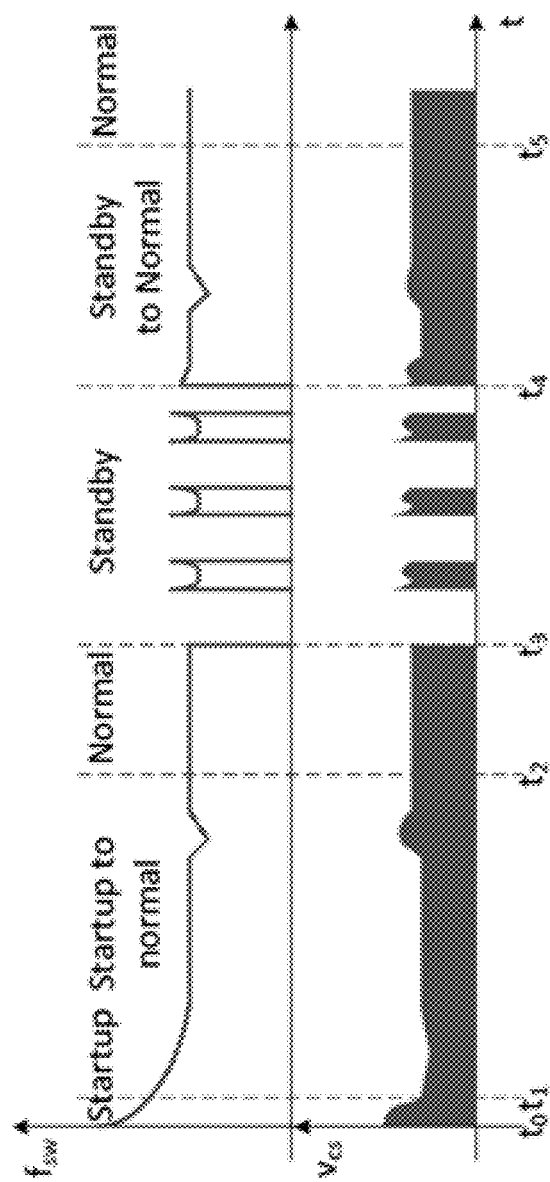
FIG. 5 is a timing diagram illustrating phases of operations for which various forms of current protection are applied by the SMPS of FIG. 3 and/or FIG. 4, in accordance with aspects of the invention.

FIG. 5 is a timing diagram illustrating waveforms of examples of signals of examples of SMPS 300 of FIG. 3 and/or SMPS 400 of FIG. 4. One particular example is discussed below with regard to FIG. 5, but the disclosure is not limited to the specific example discussed below with respect to FIG. 5, which is described by way of example only. FIG. 5 shows a timing diagram of switching frequency $f_{sw}$ (the switching frequency of primary winding current Ipw) and current sense voltage $V_{CS}$ (where an example of $V_{CS}$ is referred to simply as current sense signal CS in FIG. 3 and FIG. 4) over time (t), where time $t_0$ represents the beginning of system startup, time $t_1$ represents the end of system startup and the beginning of the transition from system startup to normal operation, time $t_2$ represents the first beginning of normal operation after time $t_1$, time $t_3$ represents the beginning of standby operation, time $t_4$ represents the end of standby operation and the beginning of the transition from standby operation to normal operation, and $t_5$ represents the beginning of normal operation after time $t_4$.

From $t_0$ to $t_1$ during system startup, the in-rush current limitation and level 2 OCP are active. At $t_0$, the converter is cold-started. Large in-rush current in the SMPS is found during $t_0$ to $t_1$ to charge up the resonant capacitance and the output capacitance. That is, a high current spike may occur during $t_0$ to $t_1$ after the fresh system startup at time to. In some examples, the period between $t_0$ to $t_1$ is predefined in firmware in switch controller 420 according to the system design.

From $t_1$ to $t_2$ during transition from system startup to normal operation, level 1 OCP and level 2 OCP are active. During $t_1$ to $t_2$, there is a risk of capacitive load applied resulting in high current spikes. To avoid mistriggering of OCP1 protection, a higher OCP1 protection threshold than the normal OCP1 protection is set. In some examples, the period between $t_1$ to $t_2$ is predefined in firmware in switch controller 420 according to the system design.

From $t_2$ to $t_3$ and after $t_5$, the system is in normal operation, and level 1 OCP, level 2 OCP, and OLP are active. Also, during these time periods, the normal OCP1 protection threshold is used, as opposed to the increased protection threshold used during the time interval of $t_1$ to $t_2$. By using the normal OCP1 protection threshold during normal operation, rather than the increased threshold, the SMPS may be protected against over-loading and hard-switching may be prevented. Losing soft-switching of LLC primary switches may be a major catastrophic failure conditions that may damage the SMPS.

From $t_3$ to $t_4$, the system is in standby mode, and in-rush current limitation and level 2 OCP are active. At the start of every burst-on phase and when leaving standby mode, there may be a high in-rush current that depends on the loading and the system design. Accordingly, it is difficult to set an appropriate level 1 OCP protection level during standby mode as the protection level might be very high to avoid mistriggering OCP1 protection when high current spikes occur at the start of each burst that occurs during the standby phase. Current limitation is more effective during the standby mode operation. The converter will leave standby to normal operation if a short circuit happens during standby operation, and level 1 OCP will take over the protection. The time period from $t_3$ to $t_4$ may be employed as a burst phase or burst-on phase, in accordance with some examples.

From $t_4$ to $t_5$ during a transition from standby mode to normal operation, level 1 OCP and level 2 OCP are active. Similar to that from $t_1$ to $t_2$, a higher protection threshold for OCP1 is used to avoid mistriggering of OCP1 protection due to capacitive load. In some examples, the period between $t_4$ to $t_5$ is predefined in firmware in switch controller 420 according to the system design.

In some examples, the purpose of OCP1 protection is mainly for short circuit protection. In some examples, a protection threshold is set to capture the over-current event. In some examples, once current sense voltage Vcs is higher than the protection threshold, an OCP1 event happens and the following subsequent actions are triggered. The primary switch is turned off immediately, and an OCP1 interrupt subroutine is entered. The LLC operation frequency is increased to a higher value, with the duty cycle decreased, so that the power being transmitted to the secondary side of the SMPS and the power being transmitted to the output decreases. The LLC gate drive unit continues operating. That is, the gating signal is generated continuously with proper dead time, and will use the new period value set in the interrupt. In the interrupt subroutine, the control of the primary switch is adjusted to decrease the operation frequency and try to recover to normal operation. By turning off the primary switch immediately when OCP1 protection is triggered, hard-switching will not occur.

In some examples, the OCP1 protection is highly dynamic to the characteristic of the LLC converter. As such, in some examples, most run-time hard-switching issues may be solved by adaptive setting of the protection level of OCP1 in different working conditions. For example, as previously discussed, the threshold for OCP1 protection may be set to a level that is higher than normal during certain phases, while using the standard lower level during other phases, as discussed in greater detail above with respect to FIG. 5.

In some examples, as another part of the OCP1 protection, consecutive OCP1 events are also counted. In these examples, the SMPS enters auto-restart protection, which restarts the SMPS, if OCP1 events happen consecutively a particular number of times, such as eight consecutive OCP1 events in one example.

In some examples, the purpose of OCP2 is mainly for severe shoot-through protection. The OCP2 comparator protection threshold is higher than that of OCP1. In some examples, once the OCP2 event is triggered, the SMPS stops operating immediately and then goes into an auto-restart sequence which restarts the SMPS.

In some examples, ICL protection is used in startup and burst-on phases. In some examples, when either of these phases is occurring, because the LLC resonant capacitor has initially been fully discharged, there is a high inrush current when the gate of transistor M1 is turned on. This high inrush current may be harmful to the components if the current is not limited. Also, if ICL protection were not present during startup and burst-on phase, the OCP1 protection might undesirably be triggered. Inrush current is natural and is not caused by any fault condition.

During the phases in which ICL protection is used, OCP1 protection is not used. During phases in which ICL protection is used, once the inrush current reaches the limitation threshold, the primary switch (e.g., transistor M1 of FIG. 3 or switch SW1 of FIG. 4) is turned off immediately. In some examples, unlike to OCP1 protection, in which the operation period is changed when an OCP1 event occurs responsive to the OCP1 event, when an ICL event occurs (i.e., with the primary winding current Ipw reaches the ICL threshold), the operation frequency is not changed responsive to the ICL event.

After the ICL event occurs, the primary switch is turned off immediately, and is forced to remain off for a particular period of time that is at least one switching cycle. The inrush current limitation (forcing the primary switch to remain off) is enabled for a particular amount time, so it could be effective for more than one switching cycle in some examples. The ICL protection does not affect the soft-start sequence of the SMPS. The ICL protection avoids hard-switching.

In some examples, during startup, when the voltage (e.g., HSVCC) to supply the primary high-side driver is not yet high enough, the primary switch is not turned out, but instead the gate of the synchronous switch is used to charge up the voltage of the high side driver's supply voltage. It may take one or several switching cycles to charge up the voltage of the high side driver's supply voltage to be sufficiently high.

In some examples, when OLP comparator 414 is triggered, switch controller 420 generates a flag. However, the primary switch is not turned off every time such a flag is generated. Rather, switch controller 420 turns off the primary switch if the flags continue be generated for a particular period of time.

In other examples, the OLP uses peak detection. In some examples, switch controller 401 further includes a peak detector circuit (not shown) that is used to capture/sample the peak current value of primary winding current Ipw. In some examples, switch controller uses the OLP protection to restart the SMPS if the OLP event is sustained for certain time, as determined by monitoring the peak current over time.

In some examples, the OLP is adaptive to different load conditions, and can be made even more adaptive by adjusting the current sensing resistor Rcs. In some examples, unlike previous method of OLP, there is no requirement that the OLP be calibrated for every board.

Some examples of the disclosure are described below.

Example 1

A device comprising: a switch-mode power supply controller, wherein the switch-mode power supply controller includes: an inrush current comparator that is arranged to compare a primary winding current with an inrush current threshold at least during at least one of a startup phase or a burst phase; and a switch controller that is arranged to control regulation of an output voltage by controlling turning of a primary switch on and off based on a feedback signal that is based, at least in part, on the output voltage; and further arranged to, if the inrush current comparator determines that the primary winding current has reached the inrush current threshold, control the primary switch to turn off and remain turned off until at least a next switching cycle.

Example 2

The device of example 1, wherein the burst phase is a standby phase.

Example 3

The device of any combination of examples 1-2, wherein the inrush comparator is arranged to compare a primary winding current with an inrush current threshold during the startup phase and the burst phase, and not during a normal operation phase.

Example 4

The device of any combination of examples 1-3, wherein the switch controller includes a digital controller.

Example 5

The device of any combination of examples 1-4, wherein the inrush current comparator is arranged to compare the primary winding current with the inrush current threshold by comparing a current sense voltage with an inrush protection voltage threshold, wherein the current sense voltage is based on the primary winding current.

Example 6

The device of any combination of examples 1-5, wherein the switch controller further includes a peak detector circuit that is employed for overload protection.

Example 7

The device of any combination of examples 1-6, wherein the switch-mode power supply controller further includes: a level one overcurrent protection comparator that is arranged to compare the primary winding current with a level one overcurrent protection threshold at least during a normal operating phase, wherein the normal operating phase does not overlap with the startup phase, and wherein the normal operating phase does not overlap with the burst phase; wherein the switch controller is further arranged to, if the level one overcurrent protection comparator determines that the primary winding current has reached the level one overcurrent current threshold, control the primary switch to turn off and remain turned off until at least a next switching cycle, and to increase a switching frequency by which the primary switch is controlled to turn on and off; and wherein the switch controller is further arranged to, if the level one overcurrent protection comparator determines that the primary winding current has reached the level one overcurrent current threshold a predetermined number of consecutive times, re-start the control of the output voltage regulation.

Example 8

The device of example 7, wherein the level one overcurrent current threshold is adaptable.

Example 9

The device of any combination of examples 7-8, wherein the level one overcurrent protection comparator is also arranged to compare the primary winding current with the level one overcurrent protection threshold at least during a transition between the startup phase and the normal operating phase, wherein the transition between the startup phase and the normal operating phase does not overlap with the startup phase, wherein the transition between the startup phase and the normal operating phase does not overlap with the burst phase, and wherein the level one overcurrent current threshold is greater during the transition between the startup phase and the normal operating phase than the level one overcurrent current threshold is during the normal operating phase.

Example 10

The device of any combination of examples 7-9, wherein the level one overcurrent protection comparator is also arranged to compare the primary winding current with the level one overcurrent protection threshold at least during a transition between a standby phase and the normal operating phase, wherein the transition between the standby phase and the normal operating phase does not overlap with the standby phase, wherein the transition between the standby phase and the normal operating phase does not overlap with the burst phase, and wherein the level one overcurrent current threshold is greater during the transition between the standby phase and the normal operating phase than the level one overcurrent current threshold is during the normal operating phase.

Example 11

The device of any combination of examples 7, wherein the switch-mode power supply controller further includes a level two overcurrent protection comparator and an overload protection comparator.

Example 12

The device of any combination of examples 1-11, further comprising a switch-mode power supply that includes the switch-mode power supply controller.

Example 13

The device of example 12, wherein the switch-mode power supply is a resonant LLC switch-mode power supply.

Example 14

A method, comprising: controlling regulation of an output voltage, including: comparing a primary winding current with an inrush current threshold at least during at least one of a startup phase or a burst phase of the regulation; controlling regulation of an output voltage by controlling of turning a primary switch on and off based on a feedback signal that is based, at least in part, on the output voltage; and if the primary winding current has reached the inrush current threshold, control the primary switch to turn off and remain turned off until at least a next switching cycle of the regulation.

Example 15

The method of example 14, wherein comparing the primary winding current with an inrush current threshold occurs during the startup phase and the burst phase, and not during a normal operation phase.

Example 16

The method of any combination of examples 14-15, wherein controlling regulation of the output voltage further includes: comparing the primary winding current with a level one overcurrent protection threshold at least during a normal operating phase, wherein the normal operating phase does not overlap with the startup phase, and wherein the normal operating phase does not overlap with the burst phase; if the primary winding current has reached the level one overcurrent current threshold: controlling the primary switch to turn off and remain turned off until at least a next switching cycle, and increasing a switching frequency by which the primary switch is controlled to turn on and off; and if the primary winding current has reached the level one overcurrent current threshold a predetermined number of consecutive times: re-starting the control of the output voltage regulation.

Example 17

The method of example 16, wherein the level one overcurrent current threshold is adaptable.

Example 18

A tangible processor-readable storage medium storing processor-executable code that, when executed, causes one or more processors to: control regulation of an output voltage, including: receiving a result of a comparison of a primary winding current with an inrush current threshold at least during at least one of a startup phase or a burst phase of the regulation; controlling regulation of an output voltage by controlling turning of a primary switch on and off based on a feedback signal that is based, at least in part, on the output voltage; and if the result of the comparison determines that the primary winding current has reached the inrush current threshold, controlling the primary switch to turn off and remain turned off until at least a next switching cycle of the regulation.

Example 19

The tangible processor-readable storage medium of example 18, wherein controlling regulation of the output voltage further includes: receiving a result of a comparison of the primary winding current with a level one overcurrent protection threshold at least during a normal operating phase, wherein the normal operating phase does not overlap with the startup phase, and wherein the normal operating phase does not overlap with the burst phase; and if the primary winding current has reached the level one overcurrent current threshold: controlling the primary switch to turn off and remain turned off until at least a next switching cycle, and increasing a switching frequency by which the primary switch is controlled to turn on and off; and if the primary winding current has reached the level one overcurrent current threshold a predetermined number of consecutive times re-starting the control of the output voltage regulation.

Example 20

The tangible processor-readable storage medium of example 19, wherein the level one overcurrent current threshold is adaptable.

Various examples have been described. These and other examples are within the scope of the following claims.

What is claimed is:

1. A device comprising:
a switch-mode power supply controller, wherein the switch-mode power supply controller includes:
a switch controller that is arranged to control regulation of an output voltage by controlling turning of a primary switch on and off based on a feedback signal that is based, at least in part, on the output voltage; and
a level one overcurrent protection comparator that is arranged to compare the primary winding current with a level one overcurrent protection threshold at least during a normal operating phase, wherein the normal operating phase does not overlap with a startup phase, and wherein the normal operating phase does not overlap with a burst phase; wherein the switch controller is further arranged to, if the level one overcurrent protection comparator determines that the primary winding current has reached the level one overcurrent current threshold, control the primary switch to turn off and remain turned off until at least a next switching cycle, and to increase a switching frequency by which the primary switch is controlled to turn on and off; and wherein the switch controller is further arranged to, if the level one overcurrent protection comparator determines that the primary winding current has reached the level one overcurrent current threshold a predetermined number of consecutive times, re-start the control of the output voltage regulation.

2. The device of claim 1, wherein the burst phase is a standby phase.

3. The device of claim 1, wherein an inrush current comparator is arranged to compare the primary winding current with an inrush current threshold during the startup phase and the burst phase, and not during the normal operation phase.

4. The device of claim 3, wherein the inrush current comparator is arranged to compare the primary winding current with the inrush current threshold by comparing a current sense voltage with an inrush protection voltage threshold, wherein the current sense voltage is based on the primary winding current.

5. The device of claim 1, wherein the switch controller includes a digital controller.

6. The device of claim 1, wherein the switch controller further includes a peak detector circuit that is employed for overload protection.

7. The device of claim 1, wherein the switch-mode power supply controller further includes:
an inrush current comparator that is arranged to compare a primary winding current with an inrush current threshold at least during at least one of a startup phase or a burst phase; and
wherein the switch controller is further arranged to, if the inrush current comparator determines that the primary winding current has reached the inrush current threshold, control the primary switch to turn off and remain turned off until at least a next switching cycle.

8. The device of claim 1, wherein the level one overcurrent current threshold is adaptable.

9. The device of claim 1, wherein the level one overcurrent protection comparator is also arranged to compare the primary winding current with the level one overcurrent protection threshold at least during a transition between the startup phase and the normal operating phase, wherein the transition between the startup phase and the normal operating phase does not overlap with the startup phase, wherein the transition between the startup phase and the normal operating phase does not overlap with the burst phase, and wherein the level one overcurrent current threshold is greater during the transition between the startup phase and the normal operating phase than the level one overcurrent current threshold is during the normal operating phase.

10. The device of claim 1, wherein the level one overcurrent protection comparator is also arranged to compare the primary winding current with the level one overcurrent protection threshold at least during a transition between a standby phase and the normal operating phase, wherein the transition between the standby phase and the normal operating phase does not overlap with the standby phase, wherein the transition between the standby phase and the normal operating phase does not overlap with the burst phase, and wherein the level one overcurrent current threshold is greater during the transition between the standby phase and the normal operating phase than the level one overcurrent current threshold is during the normal operating phase.

11. The device of claim 1, wherein the switch-mode power supply controller further includes a level two overcurrent protection comparator and an overload protection comparator.

12. The device of claim 1, further comprising a switch-mode power supply that includes the switch-mode power supply controller.

13. The device of claim 12, wherein the switch-mode power supply is a resonant LLC switch-mode power supply.

14. A method, comprising:
controlling regulation of an output voltage, including:
comparing the primary winding current with a level one overcurrent protection threshold at least during a normal operating phase, wherein the normal operating phase does not overlap with a startup phase, and wherein the normal operating phase does not overlap with a burst phase;

if the primary winding current has reached the level one overcurrent current threshold;

controlling the primary switch to turn off and remain turned off until at least a next switching cycle, and increasing a switching frequency by which the primary switch is controlled to turn on and off; and if the primary winding current has reached the level one overcurrent current threshold a predetermined number of consecutive times:

re-starting the control of the output voltage regulation.

15. The method of claim 14, further comprising comparing the primary winding current with an inrush current threshold during the startup phase and the burst phase, and not during a normal operation phase.

16. The method of claim 14, wherein controlling regulation of the output voltage further includes:

comparing a primary winding current with an inrush current threshold at least during at least one of a startup phase or a burst phase of the output voltage regulation;

turning a primary switch on and off based on a feedback signal that is based, at least in part, on the output voltage; and if the primary winding current has reached the inrush current threshold, control the primary switch to turn off and remain turned off until at least a next switching cycle of the output voltage regulation.

17. The method of claim 14, wherein the level one overcurrent current threshold is adaptable.

18. A non-transitory processor-readable storage medium storing processor-executable code that, when executed, causes one or more processors to control regulation of an output voltage, including:

receiving a result of a comparison of the primary winding current with a level one overcurrent protection threshold at least during a normal operations phase, wherein the normal operating phase does not overlap with the startup phase, and wherein the normal operating phase does not overlap with the burst phase; and if the primary winding current has reached the level one overcurrent current threshold:

controlling the primary switch to turn off and remain turned off until at least a next switching cycle, and increasing a switching frequency by which the primary switch is controlled to turn on and off; and if the primary winding current has reached the level one overcurrent current threshold a predetermined number of consecutive times re-starting the control of the output voltage regulation.

19. The non-transitory processor-readable storage medium of claim 18, wherein controlling regulation of the output voltage further includes:

receiving a result of a comparison of a primary winding current with an inrush current threshold at least during at least one of a startup phase or a burst phase of the output voltage regulation;

controlling regulation of the output voltage by controlling turning of a primary switch on and off base on a feedback signal that is based, at least in part, on the output voltage; and if the result of the comparison determines that the primary winding current has reached the inrush current threshold, controlling the primary switch to turn off and remain turned off until at least a next switching cycle of the output voltage regulation.

20. The non-transitory processor-readable storage medium of claim 18, wherein the level one overcurrent current threshold is adaptable.

* * * * *